United States Patent
Syvänne (10) Patent No.: US 7,325,248 B2
(45) Date of Patent: Jan. 29, 2008

(54) PERSONAL FIREWALL WITH LOCATION DEPENDENT FUNCTIONALITY

(75) Inventor: Tuomo Syvänne, Vantaa (FI)

(73) Assignee: Stonesoft Corporation, Helsinki (FI)

( * ) Notice: Subject to any disclaimer, the term of this patent is extended or adjusted under 35 U.S.C. 154(b) by 561 days.

(21) Appl. No.: 09/988,356

(22) Filed: Nov. 19, 2001

(65) Prior Publication Data

US 2003/0097590 A1 May 22, 2003

(51) Int. Cl.
*G06F 9/00* (2006.01)
*G06F 15/16* (2006.01)
*H04L 9/00* (2006.01)

(52) U.S. Cl. ............................. 726/11; 713/166; 726/12

(58) Field of Classification Search .................. 726/11, 726/12; 713/166
See application file for complete search history.

(56) References Cited

U.S. PATENT DOCUMENTS

| | | | | |
|---|---|---|---|---|
| 2002/0078382 | A1* | 6/2002 | Sheikh et al. ................ | 713/201 |
| 2002/0087882 | A1* | 7/2002 | Schneier et al. ............. | 713/201 |
| 2003/0005089 | A1* | 1/2003 | Kumar ......................... | 709/220 |
| 2003/0055962 | A1* | 3/2003 | Freund et al. ............... | 709/225 |
| 2003/0167405 | A1* | 9/2003 | Freund et al. ............... | 713/201 |

FOREIGN PATENT DOCUMENTS

| | | |
|---|---|---|
| EP | 0 854 621 | 7/1998 |
| EP | 952 715 | 10/1999 |

\* cited by examiner

*Primary Examiner*—Kambiz Zand
*Assistant Examiner*—Christopher J Brown
(74) *Attorney, Agent, or Firm*—Barnes & Thornburg, LLP (57) ABSTRACT

A computer device is provided with a local security mechanism, a personal firewall, for protecting the computer device from attacks from a foreign network, in addition to or instead of a firewall in the internal network which protects the computer when connected to a home network. The personal firewall is provided with different sets of security rules for the home network and foreign networks. The personal firewall is arranged to detect its current location, i.e. determine to which network it is connected to at each particular moment. The personal firewall activates one of the given sets of security rules according to the detected current location of the computer device, i.e. the personal firewall automatically uses the security rules predefined for the network to which the computer device is connected at each particular moment. Upon detecting a change in the location, the personal firewall immediately adapts to use security rules predefined for the new location.

15 Claims, 4 Drawing Sheets

PERSONAL FIREWALL WITH LOCATION DEPENDENT FUNCTIONALITY

FIELD OF THE INVENTION

The present invention relates to network security and, more particularly, to personal firewalls.

BACKGROUND OF THE INVENTION

Traditionally, a firewall is considered as a set of components forming a gateway between two or more networks. Thus, a firewall has been a gateway which operates at the same time as a connector and a separator between the networks in a sense that the firewall keeps track of the traffic that passes through it from one network to another and restricts connections and packets that are defined as unwanted by the administrator of the system. Physically a firewall is a machine with appropriate software to do the tasks assigned to it. It can be a router, a personal computer (PC), or any other device that can be used for such purposes. Although firewalls are mostly used to connect Local Area Networks (LANs), i.e. internal networks, to the Internet and to protect against attackers or undesired traffic in general, they may also be used to separate and connect different segments of internal network for security purposes. The advantages of having a firewall are numerous. A firewall secures the network and can be used as a tool for monitoring the traffic especially from the outside to the inside of the network guarded by a firewall. Because all traffic intended for the internal network must pass through the firewall, most of the network security actions and policies can be concentrated in this particular point. This is of course a cost and administrative advantage.

Nowadays, laptop computers and other portable computer devices are widely used. While outside the internal network, the laptop cannot make benefit of the protection provided by the conventional "gateway-type" firewall. Therefore, approaches to improve security of a client located in a foreign network (a public network or an internal network of a foreign organisation) have been proposed. These approaches are based on protecting the laptop itself by means of a local security mechanism, called a personal firewall herein, installed in the laptop (in addition to or instead of a firewall in an internal network, which protects the computers connected to the internal network). The personal firewall may be implemented as software installed in the computer device, or as a separate electronic device connected to the computer device.

European patent application EP 0 952 715 discloses a firewall security device connected to an external communication port of a computer device. The incoming communications stream to the computer device from e.g. public networks is passed through the firewall security device. The firewall device applies standard security measures, thereby protecting the computer device.

There is a particular need for such protection by means of a personal firewall if the laptop is allowed to have a remote access, e.g. make a VPN (Virtual Private Network) connection to company network while being connected to a foreign network. In order to improve security of the VPN connections, one prior art solution is to enforce a protection level of a laptop, when a VPN tunnel to a company network is created. This means for example that, during a VPN connection, the IP address forwarding is not allowed, or that any connection attempts to the laptop are denied.

Clearly this is not enough, since the laptop must be protected as soon as it is connected to a foreign network, not only during a VPN connection. The laptops are often used by non-technical people, which increases the risk of overlooking security aspects. Laptops contain sensitive material, such as customer emails. If a laptop is unprotected, when connected to a foreign network, even for a short period of time, there is a risk of getting infected by a hostile application. Such application can be activated later, when the laptop is connected to an internal network and offer inside help for attacks.

Thus, there is a need to protect the laptop by means of a personal firewall always when the laptop is connected to a foreign network. However, when the laptop is connected to a company internal network, such personal firewall may unduly prevent some essential traffic. For example, the personal firewall should allow use of a laptop at home (internal) network and access to all services, such as diskshare. In a home network even non-IP protocols are sometimes used. Therefore, it is not feasible to have a personal firewall running at all times, at least not with the same configuration, since the protection needs in an internal network are different from those in a foreign network.

Some of the current solutions allow changing the set of rules used in the personal firewall, that is, they allow the user of the laptop to use different rule sets when connected to the internal network and when connected to a foreign network. However this is a manual operation. Since manual action is required, there is a high risk that operation is not done. Risk is even higher if the end user does not fully understand the need of a firewall.

SUMMARY OF THE INVENTION

An object of the invention is to improve the security and flexibility of a personal firewall.

A computer device which can be connected to a home network (such as an internal network of a company or other organisation where the user is employed) and to a foreign network (such as a public network or an internal network of a foreign organisation) is provided with a local security mechanism, called a personal firewall herein, for protecting the computer device from attacks from a foreign network, in addition to or instead of a firewall in the internal network which protects the computer when connected to the internal network. The personal firewall is provided with different sets of security rules, at least one set of rules for the home network and at least one set of rules for foreign networks. In its simplest form, the set of rules for the home network contains no restrictions for the communication or use of service in the home network. The personal firewall is arranged to detect its current location, i.e. to determine the network to which it is connected at each particular moment. The personal firewall activates one of the given sets of security rules according to the detected current location of the computer device, i.e. the personal firewall automatically uses the security rules predefined for the network to which the computer device is connected at each particular moment. Upon detecting a change in the location, the personal firewall immediately adapts to use security rules predefined for the new location. A benefit of the invention is that the protection of a personal firewall is always enabled at the correct level, depending on the current location. On the other hand, when the computer device is located in the home network, a lower level of protection, or no protection at all, can be automatically provided by the personal firewall, so that the communication and services are not unduly restricted in the home network. Thus, the automated location-dependent management of different sets of rules offers optimal protection in different networks, while not unduly restricting operation in the home network.

The current location of the computer device is preferably determined on the basis of a currently used IP address of the computer device. This is based on the common practice that a computer device has a different IP address, either a fixed address or a dynamic address, in different networks. The IP address can thereby be utilized for identifying the current network and the location of the computer device.

However, there are situations where the IP address fails to indicate current location of the computer device. Therefore, in an embodiment of the invention, the current location determined on the basis of the current IP address of the computer device is verified by carrying out an additional location verification procedure with a predetermined network element. In a still further embodiment of the invention, availability of said predetermined network element related to the current IP address is checked. The predetermined network element is such that it responses only if the computer device is located in the network in which it is assumed to be on the basis of the current IP address. If the predetermined network element responses and identifies itself properly, the current location determined based on the current IP address is considered to be verified. Otherwise the computer device determines that the current IP address fails to indicate current location of the computer device. The additional verification process makes it even possible to automatically create a secured tunnel, such as a VPN tunnel to a home network even if the computer device uses the same IP address in the current location as in the internal (home) network. The present invention offers benefits even with stand alone personal firewalls wherein the security rules can be defined locally by the user, although the use of these rules is automated and location-dependent. However, more advantages are achieved when the basic invention is used with a central management of personal firewalls.

According to an aspect of the invention, security rules are defined, updated and distributed centrally by a centralized rule-based server. Especially the updating of the rules is challenging, because the rule updates must be applied as soon as possible, and therefore the process of updating rules in the personal firewalls must be automated. Updating of rules by push method from the centralized rule base server is not a sufficient option in this case. Use of DHCP (Dynamic Host Configuration Protocol), frequent travelling and the fact that at times the laptop may not be connected to any network makes it next to impossible for the centralized management to initiate contacts with the personal firewalls in the computer devices, because there is no way for the centralized management to know the IP address the computer device is using at a given moment. Therefore, according to an aspect of the invention, the personal firewall is configured to periodically query the availability of updated security rules from the centralized management. The queries should only be made, while the computer device is located in the home network, or optionally, when the computer device has a remote access (e.g. VPN connection) to the home network while being located in a foreign network. In other words, also the updating process is dependent on the current location of the computer device in a similar manner as the selection of the active rules, and similar methods can be utilized for determining the current location.

According to another aspect of the invention, log files containing information of a status and usage of resources of the computer device are handled in a centralized management location. This enables personnel aware of security aspects to verify whether there have been any attacks against the computer device or not. To that end, the personal firewall sends the log files to the central management, such as to a centralized log server, when the computer device is located in the home network. However, when the computer device is disconnected from the home network, the log files are collected and stored locally in the firewall. In order to enable central handling of the log files, the personal firewall transfers the collected log files to the central log server when such is available. This is performed automatically, whenever the computer device is located in, or optionally, connected to the home network. Again, the handling of the log files in the personal firewall is automated and location dependent in a way similar to the selection of active rules, and similar methods can be used for determining the current location of the computer device.

The present invention allows use of a computer device in a home (internal) network and access to all services, such as disc-share, and even use of non-IP protocols, which are often denied in foreign networks.

BRIEF DESCRIPTION OF THE DRAWINGS

Preferred embodiments of the invention will now be described with reference to the attached drawings, in which.

PREFERRED EMBODIMENTS OF THE INVENTION

The present invention can be applied in personal firewalls in any computer device which can be moved and connected to different networks. Typically such devices are portable computer devices, such as laptop computers, PDAs, communicators, smart phones, intelligent telecommunication devices, etc. In the following illustrative embodiments of the invention, a laptop computer is used as an example of suitable computer devices.

Figure 1:
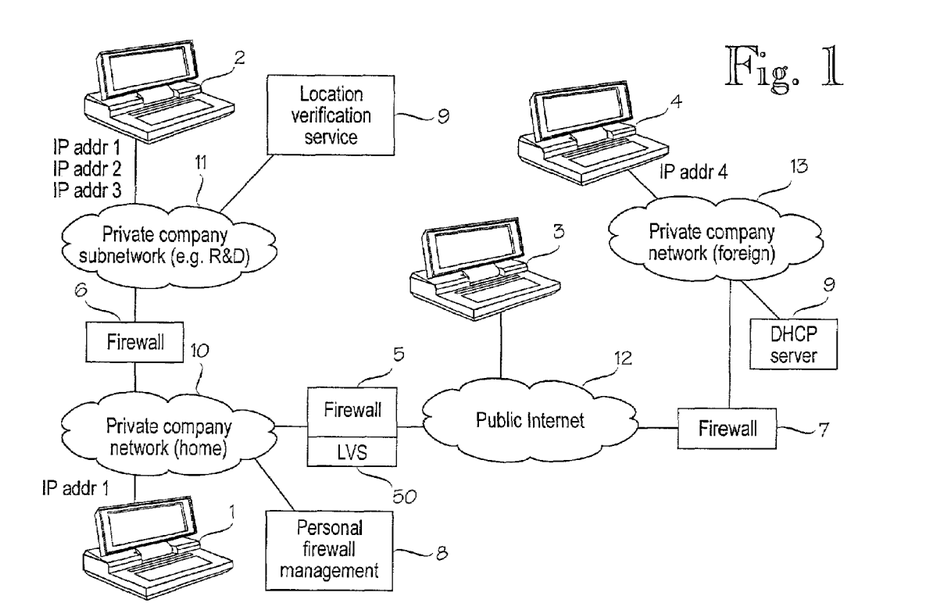
FIG. 1 is a schematic block diagram of an exemplary network configuration where the present invention can be applied.

FIG. 1 shows a schematic block diagram of an exemplary network configuration. The configuration is shown only to facilitate the understanding and description of the present invention. The present invention is not intended to be restricted to any particular network configuration. Further, in order to improve clarity, only network elements which are somehow involved with the present invention are shown in FIG. 1.

As illustrated in FIG. 1, private local networks 10 and 13 are coupled to a public network, such as the Internet 12 via firewalls 5 and 7, respectively. Naturally, the coupling between the private networks and the public Internet 12 may include also routers and Internet service providers (ISPs not shown in FIG. 1). As is well known in the art, private networks 10 and 13 may be, for example, company networks, such as local area networks (LANS) which connect users and resources, such as workstations, servers, printers and the like of the company. A private internal network may also consist of several sub-networks separated by internal firewalls. In the exemplary network configuration shown in FIG. 1, the private company sub-network 11 is connected via a firewall 6 to the private local network 10. Such a sub-network 11 may be, for example, a dedicated network for a specific department of the organisation, such as the research and development (R&D) department which must have a restrictive access and higher protection level compared with other part of the company network. Sub-networks of the company, such as the local networks of organisation headquarters and branch offices may be interconnected by secure connections, such as virtual private network (VPN).

As already described above, the firewalls 5, 6 and 7 are gateways which operate at the same time as connectors and separators between the networks in a sense that the firewall keeps track of the traffic that passes through it from one network to another and restricts connections and packets that are defined as unwanted by the administrator of the system. Physically a firewall is a machine with appropriate software to perform the task assigned to it. It can be a router, a personal computer (PC), or whatever that can be used for such purposes.

However, the firewalls between the networks, or the implementations thereof, are not relevant to the present invention.

The present invention relates to protecting of the computer device, e.g. laptop itself, by means of a local security mechanism, called a personal firewall herein, installed on the laptop in addition to or instead of a firewall in a private network. The personal firewall may be implemented as software installed and run in the computer device, which is a preferred embodiment, or as a separate electronic device connected to the computer device. In FIG. 1, the laptops 1, 2, 3 and 4 illustrate laptops provided with a personal firewall.

Figures 2, 3:
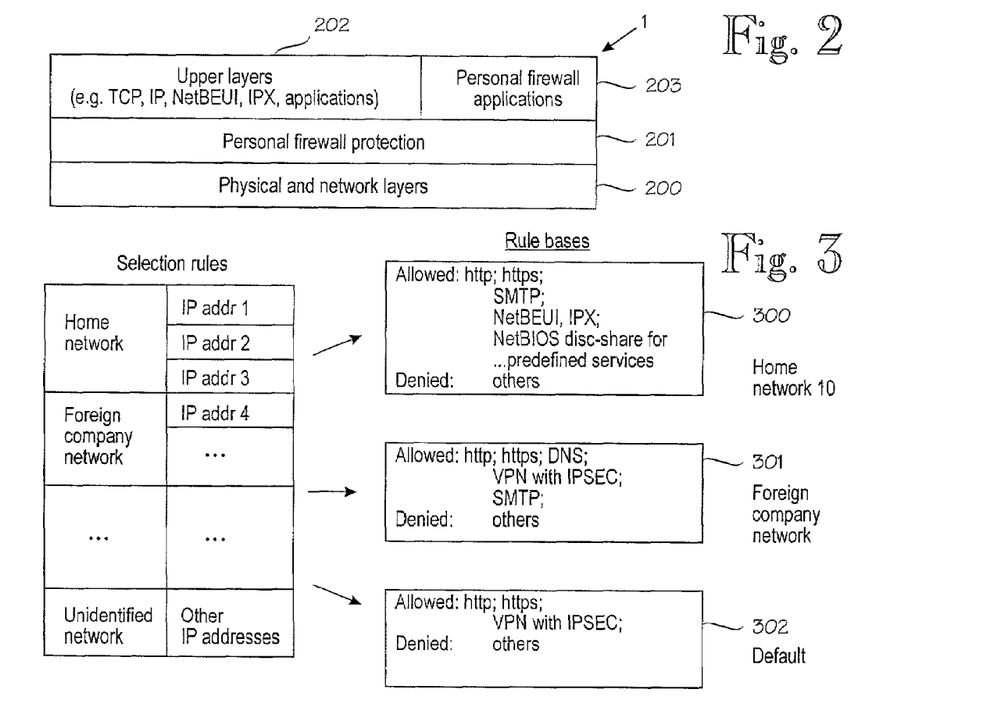
FIG. 2 shows an exemplary protocol stack of a computer device containing a personal firewall according to the present invention.
FIG. 3 illustrates exemplary selection rules and a security rule basis, and the association therebetween.

FIG. 2 illustrates the basic principle of a personal firewall installed in a laptop. Physical and network layers 200 refer to all protocols and physical connections required for transferring protocol data units (PDUs) of the upper layers. The upper layers 200 include applications and any transmission protocols employed, such as Internet protocol (IP) transmission control protocol (TCP), NetPEUI, IPX, etc. Basically the personal firewall protection layer 201 operates in a manner analogue to a firewall between networks. More particularly, the personal firewall protection layer 201 operates at the same time as a connector and a separator between the underlying layers and the upper layer in a sense that the personal firewall keeps track of the traffic that passes through it from underlying layers to the upper layers, and vice versa, and restricts connections and packets that are defined as unwanted according to the security rules used. The personal firewall protection layer 201 is implemented or controlled by a personal firewall application 203 run in the laptop. In a preferred embodiment of the invention, the personal firewall application 203 carries out the location detection and the location-dependent functions described below, such as the selection of the active rule base according to the current location of the laptop. However, it should be appreciated that the present invention is not intended to be restricted to any specific practical implementation of the personal firewall.

In accordance with the principles of the present invention, the personal firewall has different sets of rules for the home network (such as the private company network 10) and foreign network, such as the public Internet 12, or the foreign private network 13, or a network of another department of the company. It is not relevant to the present invention what kind of security rules are applied, but some examples are given in FIG. 3. For example, a rule base 301 for the foreign company network may list as allowed connections of protocols: hypertext transfer protocol (http), secured http (Https), domain name service (DNS), single message transfer protocol (SMTP) and a VPN connection with IPsec. In the preferred embodiment of the invention these rules are exclusive, in other words, other protocols and connections are denied and blocked by the personal firewall. For a default network, which may be the public Internet 12, the rule base 302 is similar to the rule base 301, except that the SMTP protocol is no longer allowed. For the home network 10, a rule base 300 is defined. The allowed protocols include, in addition to the http, https and the SMTP, also other transmission protocols, such as NetBEUI and IPX. The rule base 300 also allows a disc-share for predefined servers using NetBIOS. Other protocols and connections are denied. It is also possible that the rule base 300 allows all protocols and connections in the home network. Since the home network is protected by a company firewall, the use of a personal firewall in the home network may be regarded as unnecessary. However, the company firewall gives protection only against attacks from the outside of the home network, and the use of a personal firewall protection may be necessary for protecting against attacks from within the home network.

The different rule bases could be activated manually by a user. However, according to the basic principle of the present invention, the personal firewall automatically selects and activates the proper rule base according to the current location of the laptop.

Figure 4:
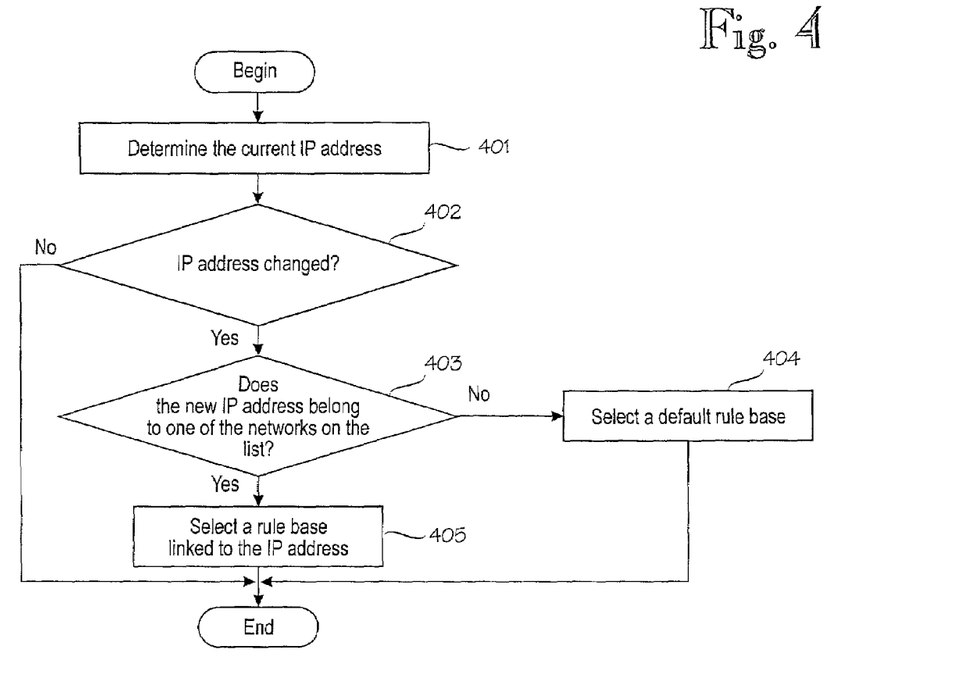
FIG. 4 is a flow diagram illustrating a location-dependent rule base selection according to an embodiment of the invention.

FIG. 4 is a flow diagram illustrating the selection of the rule base according to one embodiment of the present invention. The simplest way to determine the current location of the laptop is to do it on the basis of the currently used IP address only. This is possible in the cases where the laptop has a different IP address, either a fixed or a dynamic address, in different networks. As is well known in the art, a part of the IP address identifies the network, and can thus be used for detecting the current network of the laptop. The personal firewall may, for example, contain information on the IP address space of home network, and optionally, foreign networks, or a list of addresses available for the laptop in the home network.

When the current IP address of the laptop matches to a given address space or a list of addresses of the home network 10, for example, it can be assumed that the laptop is located in the home network 10 and the rule base 300 of the home network 10 is used. Thus, the current IP address is used as a selection rule for activating the rule base 300. However, there is some uncertainty in determining the location based on the current IP address only, and some approaches to overcome this problem are described with reference to further embodiments of the invention below.

Referring again to the generic flow diagram shown in FIG. 4, the current IP address of the laptop is firstly determined in the step 401. The current IP address may be obtained simply by asking for it from the operating system of the laptop by means of using IP configuration routine. The current location of the laptop is monitored constantly, and therefore the personal firewall may be configured to periodically query the current IP address from the operating system. More preferably, the operating system of the laptop may be configured to inform any changes in the IP address to the personal firewall, and therefore a need for query the IP address time-to-time can be avoided. The step 401 may also include verification of the location determined based on the IP address by a verification procedure described below. In step 402, the personal firewall compares the current IP address with the current IP address stored in the personal firewall. If the IP address has not changed, the present active rule base can be maintained. However, if the IP address has changed, the personal firewall checks whether the new IP address matches to any IP address space or IP address belonging to one of the networks on the selection rule list in the personal firewall (step 403). If the new IP address does not belong to any of the networks on the selection rule list, the personal firewall considers the current network an unidentified network, and a default rule base 302 is selected (step 404). If the network cannot be identified and the default rule base must be used, it is normally assumed that the laptop is in a potentially hostile environment, most likely in the public Internet 12. Therefore, the default rule base is typically defined to provide the maximum protection needed. If the new IP address belongs to one of the networks defined on the selection rule list in step 403, it means that the network has been identified and a rule base linked to the identified network (or the corresponding selection rule) is selected and activated (step 405). In the simplest implementation, the selection rules include only the home network of the laptop and the corresponding IP address space or list of addresses. If the current IP address belongs to the home network, the rule base 300 of the home network 10 is used. Otherwise the rule base 310 for foreign network or the default rule base 302 is used. In a more complicated implementation, there are selection rules (i.e. IP addresses and associated rule bases) also for at least one foreign network and/or different segments of the home network 10.

In the examples described above there are two or more rule bases which are enabled or disabled on the basis of the current location of the laptop. However, there are also alternative ways to implement different rule bases. One alternative is to provide only one rule base in which the rules are enabled and disabled in different combinations on the basis of the current location of the laptop.

As noted above, there are situations where the location (the current network) determined on the basis of the current IP address is uncertain, i.e. the IP address fails to indicate the current location of the laptop. If the IP address does not match the current network, use of the Internet protocol (IP) to attack against the laptop is not likely, and one may reason that in that case a personal firewall does not need to be used. However, there is still a possibility that there is an attack using other protocols, such NetBEUI or IPX. By detecting the situation where the IP address of the laptop is not an IP address of the current network, it is possible to block such protocols while in foreign networks. Further, NAT (network address translation) and private IP addresses are frequently used. This means that the same IP address is in use in several networks. In that case it is not enough to trust IP address information only when determining the location of the laptop. It is even possible that while being connected to a hostile network, the DHCP (dynamic host configuration protocol) gives familiar IP address to make it easier to attack the laptop. Basically, the DHCP enables individual computers on a network to connect to a DHCP server, such as the server 9 in FIG. 1, and be assigned a dynamic IP address of the current network.

Thus, according to an aspect of the invention, in addition to the detection of location based on the current IP address described above, a further location verification procedure is carried out with a predetermined network element, which is preferably reachable only from the location to be verified. More generally, the network element is selected in such a way that it responses to the verification request only if the request originates from the location (i.e. the network) to be verified. Preferably, the specific network element is provided with a location verification service supporting the verification according to the invention. The verification procedure requires that the verification method be specified for the personal firewall, preferably at the same time as the different locations are specified. In other words, the methods to verify the location are specified for the personal firewall in the initial configuration, for example. It is also possible that the verification methods are updated or changed by means of the updating procedure described below, in a manner similar to other security rules.

Figure 5:
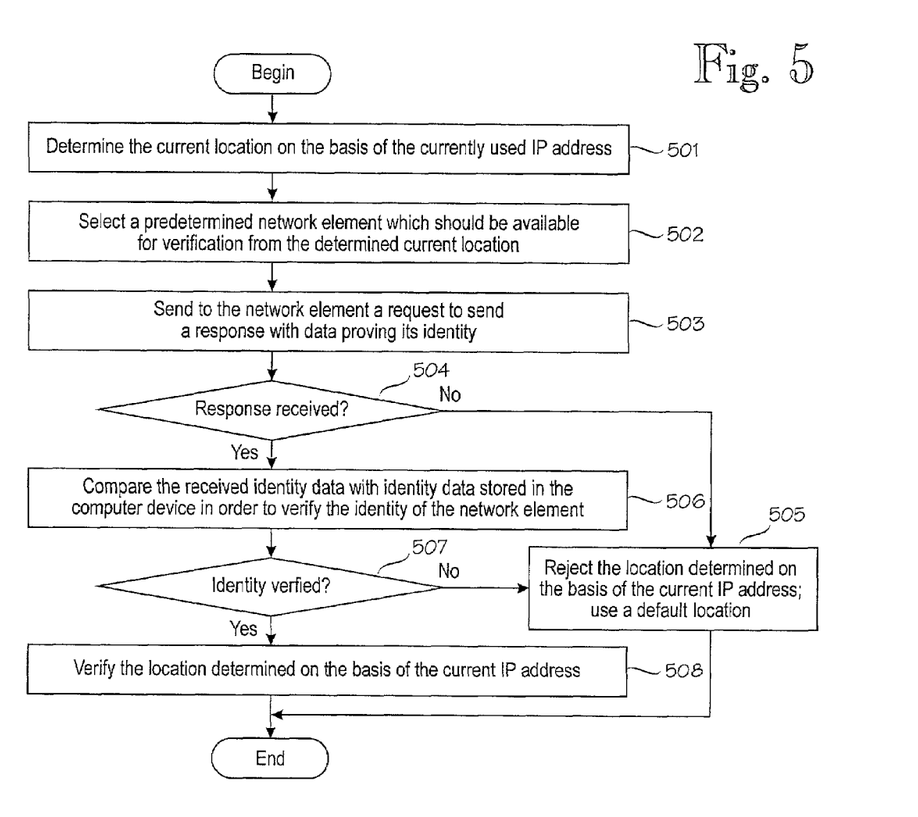
FIGS. 5 and 6 are flow diagrams illustrating the location verification procedure according to an embodiment of the invention.
Figure 6:
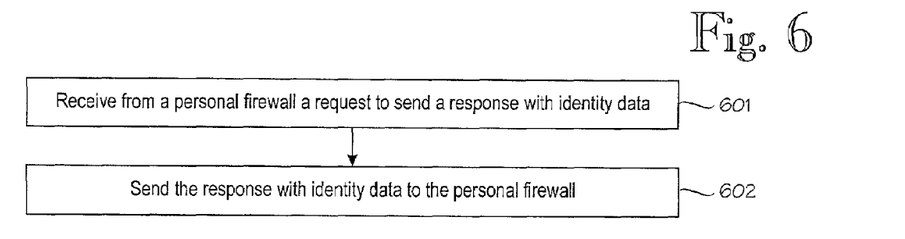

A generic location verification procedure according to one embodiment of the invention is described with reference to FIGS. 5 and 6. Firstly, the current location is determined on the basis of the currently used IP address as described above (step 501). Next, the personal firewall selects a predetermined network element that should be available for verification from the determined current location (step 502). Then the personal firewall sends to the selected network element a request to send a response with some data proving the identity of the network element (step 503). Referring now to FIG. 6, the verifying network element receives the verification request (step 601) from a personal firewall. Then, either always in response to the verification request or only if predetermined requirements are met, the network element sends the response with the required identity data to the personal firewall (step 602). Referring again to FIG. 5, the personal firewall waits for a response (step 504), and if no response is received (preferably within a predetermined period of time), the location determined on the basis of the current IP address is rejected, and the location is determined to be unknown (step 505). In that case, a default location and an associated rule base, such as the rule base 302, can be used.

However, if the response is received from the network element in the step 504, the personal firewall verifies the identity of the network element on the basis of the received identity data, e.g. by comparing the received identity data with identity data stored in the personal firewall (step 506). If the verification of the identity is unsuccessful (step 507), the procedure proceeds to the step 505 described above. However, if the verification of the identity of the network element is successful, also the location of the laptop determined on the basis of the current IP address has been successfully verified and can be accepted.

Additionally, it is possible that one IP address is included in more than one selection rule in the personal firewall. In that case, if the verification of the laptop being located in a first network indicated by the current IP address fails, it is checked if the laptop is located in a second network indicated by the current IP address. There are various ways to implement the generic location verification procedure described above. The simplest way to implement the location verification service is to probe some known (known to the personal firewall) element. For example, it is possible to ask the MAC address of the known network element located in the home network and having a known IP address. The network element returns the MAC address in response, and if the AMC address is the one that it is assumed to be (e.g. matches with a MAC address stored in the personal firewall), it is verified that the laptop is located in the home network. If the MAC address is not the correct one, the laptop is determined to be outside the internal network.

One possible implementation is that the location verification service is implemented in such network element in an internal network which can be reached only from inside the internal network. For example, the firewall protecting the internal network, such as firewall 5 in FIG. 1, may be configured to discard all connections from outside the internal network to this network element. If the personal firewall is able to reach this specific network element, it is verified that the personal firewall resides inside the internal network. Otherwise the personal firewall resides outside the internal network. There may be a plurality of such location verification services in a plurality of internal networks or sub-networks, and if the personal firewall cannot reach any of them, then it is assumed to be outside this plurality of internal networks or sub-networks.

The location verification service may be incorporated into the network firewall, such as the location verification service 50 in the firewall 5 in FIG. 1. For example, verification requests only from the direction of the internal network (such as home network 10) may be responded by the location verification service 50. This implementation is rather straightforward, since the present firewalls are readily capable of detecting from which direction, that is, from which interface, a data packet is coming from.

In any case it is preferred that the personal firewall communicates with the location verification service by using some cryptographically strong method, such as public key encryption. For example SSL can be used. The certainty of the location verification can be further improved by setting the TTL (time-to-live) field in the location verification request to a relatively low value, so that the request is capable of reaching only a nearby location verification service. The TTL value is decremented each time the verification request passes through a router connecting different networks or network segments. If the TTL value is set to, for example, a zero value the verification request is not able to pass through a router to a different network or a network segment.

The use of additional location verification makes it even possible to automatically create a VPN tunnel to the home network even if the current location (a foreign network) is using the same IP address as in the internal network.

All the embodiments described above are effective both in standalone computers and in centrally managed computers. The central management of personal firewalls enables a uniform protection level in all computer devices using the private network. One feature of the central management is that preferably all of the personal firewalls have essentially similar security rules. It should also be possible to update these. It is preferable that rule updates are applied in the personal firewalls as soon as possible after they have been made in the central management. Because it is not sufficient to rely on the manual updating by the user, the process of updating the rules must be automated. However, distribution of the updated rules by a push transmission from the central management is not a sufficient option in a case where the personal firewalls can move from one network to another. Therefore, according to an aspect of the invention, the personal firewalls are arranged to periodically query the availability of updated rules from the central management.

Figure 7:
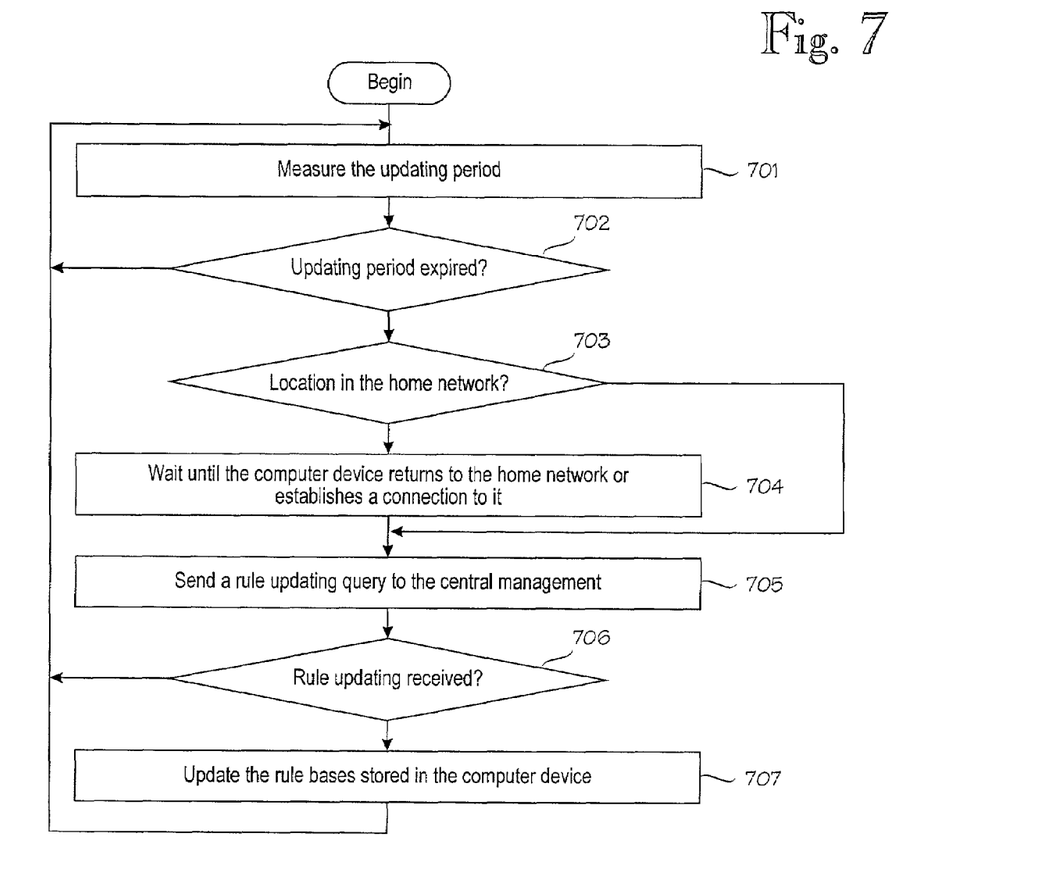
FIGS. 7 and 8 are flow diagrams illustrating the rule base updating according to an embodiment of the invention.
Figure 8:
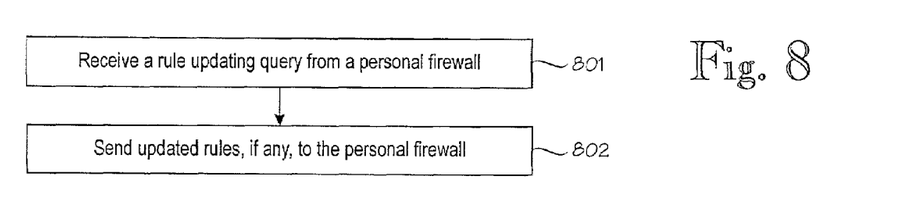

An updating procedure according to one embodiment of the invention is described with reference to FIGS. 7 and 8.

Firstly, a personal firewall measures a predetermined updating period, which can be any period of time, preferably one day or a few days (step 701). In step 702, the personal firewall checks whether the updating period has expired, and if not, the procedure returns to the step 701. When the updating period has expired, the personal firewall checks whether the current location of the laptop is in the home network (step 703) or in another sub-network of the same company. The location determination is preferably based on the methods described above. If the current location is in the home network, the process proceeds directly to the step 705. However, if the current location is not in the home network, the personal firewall waits for the laptop to return to or establish a connection (e.g. VPN) to the home network (step 704), before proceeding to the step 705. In the step 705, the personal firewall sends a rule update query to the central management, such as the personal firewall management server 8 in FIG. 1. Referring now to FIG. 8, the personal firewall management 8 receives the rule update query from the personal firewall (step 801) and sends updated rules, if there are any, to the personal firewall (step 802). Referring again to FIG. 7, the personal firewall checks whether the reply received from the personal firewall management 8 contains rule updatings (step 706), and if not, the process returns to the step 701 to measure the next updating period. However, if rule updatings have been received, the personal firewall updates the relevant rule bases stored in the laptop (step 707).

Figure 9:
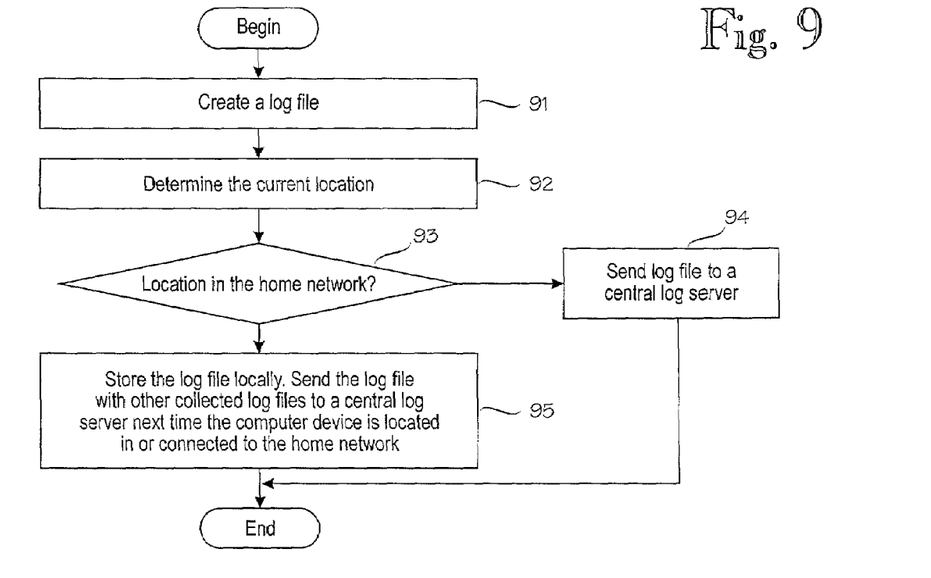
FIG. 9 is a flow diagram illustrating the handling of log files according to an embodiment of the invention.

It is also preferable that the logs relating to the communication transactions of the laptop are handled in a central location. Since the laptops are frequently disconnected from the home network, logs must be collected locally. In order to enable central handling, the logs must be transferred to a central log server, such as the personal firewall management 8, when such is available. This should take place automatically when the computer device provided with a personal firewall is connected to the home network. FIG. 9 illustrates log handling according to one embodiment of the invention.

Firstly, the personal firewall creates a log file each time the laptop is involved with a communication transaction, such as an Internet session (step 91). Then the personal firewall determines the current location of the laptop, preferably based on the location determining methods described above (steps 92 and 93). If the location of the laptop is in the home network or in another subnetwork of the same company, the personal firewall sends the log file to the central log server 8 immediately (step 94). However, if the current location of the laptop is not in the home network, the process proceeds to the step 95, where the log file is stored locally. Similarly, a number of log files is collected locally while the laptop is disconnected from the home network. When the personal firewall next time detects that the computer device is relocated in the home network, it sends the collected log files to the central log server 8. Optionally, the personal firewall may also send the collected log files to the personal firewall management 8 when the laptop has established a (e.g. VPN) connection to the home network.

It is apparent for those skilled in the art that the illustrative embodiments described are only examples and that various modifications can be made within the scope and spirit of the invention as defined in the appended claims.

The invention claimed is:

1. A method of controlling a personal firewall in a client computer, said method comprising providing said personal firewall with at least one set of security rules to be used when said client computer is connected to a home network of said client computer, and at least one set of security rules to be used when said client computer is connected to foreign networks, determining by said personal firewall a current location of said client computer based solely on an Internet Protocol(IP) address currently used by said client computer, selecting by said personal firewall a predetermined network element that should be available for verification from the current location determined based solely on the IP address currently used by said client computer, said predetermined network element being able to respond only if said client computer is located in the network in which it is assumed to be on the basis of the current IP address, sending by the personal firewall to the selected predetermined network element a request to send a response with some data proving an identity of the selected predetermined network element, and automatically selecting by the personal firewall one of said sets of security rules by said personal firewall according to said current location of said client computer, if the selected predetermined network element sends a response with the required identity data to the personal firewall and thereby verifies the current location determined based solely on the IP address currently used by said client computer, or determining the current location unverified and selecting a default set of security rules by the personal firewall, if the personal firewall fails to receive from the selected predetermined network element a response with the required identity data which verifies the current location determined based solely on the IP address currently used by said client computer.

2. A method according to claim 1, wherein said providing comprises providing said client computer with said set of security rules in form of at least two rule bases, said step of selecting a set of security rules comprises enabling one of said rule bases at a time according to the current location of said client computer.

3. A method according to claim 1, wherein said providing comprises providing said client computer with said set of security rules in form of one rule base, and said step of selecting a set of security rules comprises enabling and disabling rules in said one rule base in different combinations according to the current location of said client computer.

4. A method according to claim 1, wherein said determining comprises storing in said client computer an IP address space of said home network, comparing the current IP address of said client computer with said IP address space, and if the current IP address of said client computer matches said IP address space, determining said personal firewall to be located in said home network.

5. A method according to any one of claims 1, 2 or 3, wherein said determining comprises storing in said client computer a list of IP addresses of said home network, comparing the current IP address of said client computer with said list of IP addresses, and if the current IP address of said client computer matches one of said addresses on said list, determining said client computer to be located in said home network.

6. A method according to claim 1, wherein said specific identity data is a Media Access Control (MAC) address of said predetermined network element.

7. A method of managing a personal firewall in a client computer, comprising storing in said personal firewall at least one set of security rules to be used when said client computer is connected to a home network of said client computer, and at least one set of security rules to be used when said client computer is connected to foreign networks, storing updated sets of security rules, if any, in a centralized unit in said home network of said client computer, determining by said personal firewall a current location of said client computer based solely on an internet Protocol (IP) address currently used by said client computer, selecting by said personal firewall a predetermined network element that should be available for verification from the current location determined based solely on the IP address currently used by said client computer, said predetermined network element being able to respond only if said client computer is located in the network in which it is assumed to be on the basis of the current IP address, sending by the personal firewall to the selected predetermined network element a request to send a response with some data proving an identity of the selected predetermined network element, and automatically selecting by the personal firewall one of said sets of security rules by said personal firewall according to said current location of said client computer, if the selected predetermined network element sends a response with the required identity data to the personal firewall and thereby verities the current location determined based solely on the IP address currently used by said client computer, or determining the current location unverified and selecting a default set of security rules by the personal firewall, if the personal firewall fails to receive from the selected predetermined network element a response with the required identity data which verifies the current location determined based solely on the IP address currently used by said client computer, and further comprising configuring said personal firewall to periodically query the availability of said updated sets of security rules from said centralized rule base server when being located in said home network, or when having a remote access to said home network while being located in a foreign network, and loading said updated sets of security rules from said centralized rule base server to said personal firewall in response to said query, if such updated sets of security rules are available.

8. A method according to claim 7, comprising monitoring the current location of said client computer based on an Internet Protocol (IP) address currently used by said client computer, and automatically activating said periodical query, when the current location of said client computer is in said home network.

9. A method according to claim 7, comprising monitoring the current location of said client computer based on an Internet Protocol (IP) address currently used by said client computer, sending log files to a centralized log server from said personal firewall when the current location of said client computer is in said home network, said log files containing information on communication transactions in said client computer, collecting log files locally at said personal firewall, when the current location of said client computer is not in said home network, and transferring said locally collected log files from said personal firewall to said centralized log server, when said client computer is connected to said home network.

10. A computer terminal, comprising
a personal firewall provided with at least one set of security rules to be used when said computer terminal is connected to a home network of said computer terminal, and
at least one set of security rules to be used when said computer terminal is connected to foreign networks,
said personal firewall having a mechanism determining the current location of said computer terminal based solely on an Internet Protocol (IP) address currently used by said computer terminal,
said personal firewall having a mechanism selecting a predetermined network element that should be available for verification from the current location determined based solely on the IP address currently used by said client computer,
said predetermined network element being able to respond only if said client computer is located in the network in which it is assumed to be on the basis of the current IP address,
said personal firewall having a mechanism sending to the selected predetermined network element a request to send a response with some data proving an identity of the selected predetermined network element,
said personal firewall having a mechanism automatically selecting one of said sets of security rules by said personal firewall according to said current location of said computer terminal, if the selected predetermined network element sends a response with the required identity data to the personal firewall and thereby verifies the current location determined based solely on the IP address currently used by said client computer, or
said personal firewall having a mechanism automatically determining the current location unverified and selecting a default set of security rules, if the personal firewall fails to receive from the selected predetermined network element a response with the required identity data which verifies the current location determined based solely on the IP address currently used by said client computer.

11. A computer-readable medium, containing a computer software which, when executed in a computer device, causes the computer device to provide a personal firewall routine comprising
storing by said personal firewall at least one set of security rules to be used when said computer device is connected to a home network of said computer device, and at least one set of security rules to be used when said computer device is connected to foreign networks,
determining by said personal firewall the current location of said computer device based solely on an Internet Protocol (IP) address currently used by said computer device,
selecting by said personal firewall a predetermined network element that should be available for verification from the current location determined based solely on the IP address currently used by said client computer, said predetermined network element being able to respond only if said client computer is located in the network in which it is assumed to be on the basis of the current IP address,
sending by the personal firewall to the selected predetermined network element a request to send a response with some data proving an identity of the selected predetermined network element, and
automatically selecting one of said sets of security rules by said personal firewall according to said current location of said computer device, if the selected predetermined network element sends a response with the required identity data to the personal firewall and thereby verifies the current location determined based solely on the IP address currently used by said client computer, or
determining the current location unverified and selecting a default set of security rules by the personal firewall, if the personal firewall fails to receive from the selected predetermined network element a response with the required identity data which verifies the current location.

12. A computer device, comprising a personal firewall routine configured to
store security rules for a home network of said computer device, and for foreign networks,
determine current location of said client computer based solely on an Internet Protocol (IP) address currently used by said computer device,
select a predetermined network element that should be available for verification from the current location determined based solely on the IP address currently used by said computer device, said predetermined network element being able to respond only if said computer device is located in the network in which it is assumed to be on the basis of the current IP address,
send to the selected predetermined network element a request to send a response with some data proving an identity of the selected predetermined network element, and
automatically select security rules for said personal firewall according to said current location of said client computer, if the selected predetermined network element sends a response with the required identity data to the personal firewall and thereby verifies the current location determined based solely on the IP address currently used by said computer device, or
determine the current location unverified and selecting a default set of security rules by the personal firewall, if the personal firewall fails to receive from the selected predetermined network element a response with the required identity data which verifies the current location determined based on the IP address currently used by said computer device, and further to
periodically query the availability of updated security rules from a centralized rule base server in said home network of said computer device when said computer device is located in said home network, and
download said updated security rules from said centralized rule base server, if such updated security rules are available in said centralized rule base server.

13. A computer device according to claim 12, said personal firewall routine being further configured to activate said periodical query also when said computer device has a remote access to said home network while being located in a foreign network.

14. A computer device, comprising a personal firewall routine configured to determine current location of said client computer based solely on an Internet Protocol (IP) address currently used by said computer device, select a predetermined network element that should be available for verification from the current location determined based solely on the IP address currently used by said computer device, said predetermined network element being able to respond only if said computer device is located in the network in which it is assumed to be on the basis of the current IP address, send to the selected predetermined network element a request to send a response with some data proving an identity of the selected predetermined network element, and automatically select security rules for said personal firewall according to said current location of said client computer, if the selected predetermined network element sends a response with the required identity data to the personal firewall and thereby verifies the current location determined based solely on the IP address currently used by said computer device, or determine the current location unverified and selecting a default set of security rules by the personal firewall, if the personal firewall fails to receive from the selected predetermined network element a response with the required identity data which verifies the current location determined based solely on the IP address currently used by said computer device, and further to send log files to a centralized log server, when a current location of said computer device is in a home network of said computer device, said log files containing information on communication transactions in said computer device, collect log files locally in said computer device, when the current location of said client device is not in said home network, and transfer said locally collected log files to said centralized log server, when said computer device is reconnected to said home network.

15. A computer-readable medium, containing computer software which, when executed in a computer device, causes the computer device to provide a personal firewall routine comprising determining by said personal firewall a current location of said client computer based solely on an Internet Protocol (IP) address currently used by said client computer, selecting by said personal firewall a predetermined network element that should be available for verification from the current location determined based solely on the IP address currently used by said client computer, said predetermined network element being able to respond only if said client computer is located in the network in which it is assumed to be on the basis of the current IP address, sending by the personal firewall to the selected predetermined network element a request to send a response with some data proving an identity of the selected predetermined network element, and automatically selecting by the personal firewall one of said sets of security rules by said personal firewall according to said current location of said client computer, if the selected predetermined network element sends a response with the required identity data to the personal firewall and thereby verifies the current location determined based solely on the IP address currently used by said client computer, or determining the current location unverified and selecting a default set of security rules by the personal firewall, if the personal firewall fails to receive from the selected predetermined network element a response with the required identity data which verifies the current location determined based solely on the IP address currently used by said client computer, and sending log files to a centralized log server, when a current location of said computer device is in a home network of said computer device, said log files containing information on communication transactions in said computer device, collecting log files locally in said computer device, when the current location of said client device is not in said home network.

* * * * *